Aug. 30, 1966  W. M. FELTS  3,269,572
VEHICLE LOADER

Filed June 26, 1964  2 Sheets-Sheet 1

WALLACE M. FELTS
INVENTOR.

BY *Herbert J. Brown*

ATTORNEY

Aug. 30, 1966   W. M. FELTS   3,269,572
VEHICLE LOADER

Filed June 26, 1964   2 Sheets-Sheet 2

WALLACE M. FELTS
INVENTOR.

BY *Herbert J. Brown*
ATTORNEY

United States Patent Office 3,269,572
Patented August 30, 1966

3,269,572
VEHICLE LOADER
Wallace M. Felts, Fort Worth, Tex., assignor to Fruehauf Trailer Company, Detroit, Mich., a corporation of Michigan
Filed June 26, 1964, Ser. No. 378,205
3 Claims. (Cl. 214—302)

This invention relates to vehicle loaders of the type wherein portable containers are raised and tilted by power means for dumping the container contents into a vehicle body.

An object of the invention is to provide locking means whereby a portable and normally detached container is positively locked in place during its tilting operation.

Another object of the invention is to provide spring means returning the container to an upright position prior to lowering the same to the ground.

A particular object of the invention is to provide a unique pivot block and torsion spring combination at the axis of rotation of the container and which block is so constructed and arranged that partial rotation of the container locks the container as above referred to.

A further object is to provide a pivot block and torsion spring assembly which also serves as a shock absorber at the end of the tilting operation.

These and other objects will become apparent from the following description and the accompanying drawings, wherein.

Figure 1:
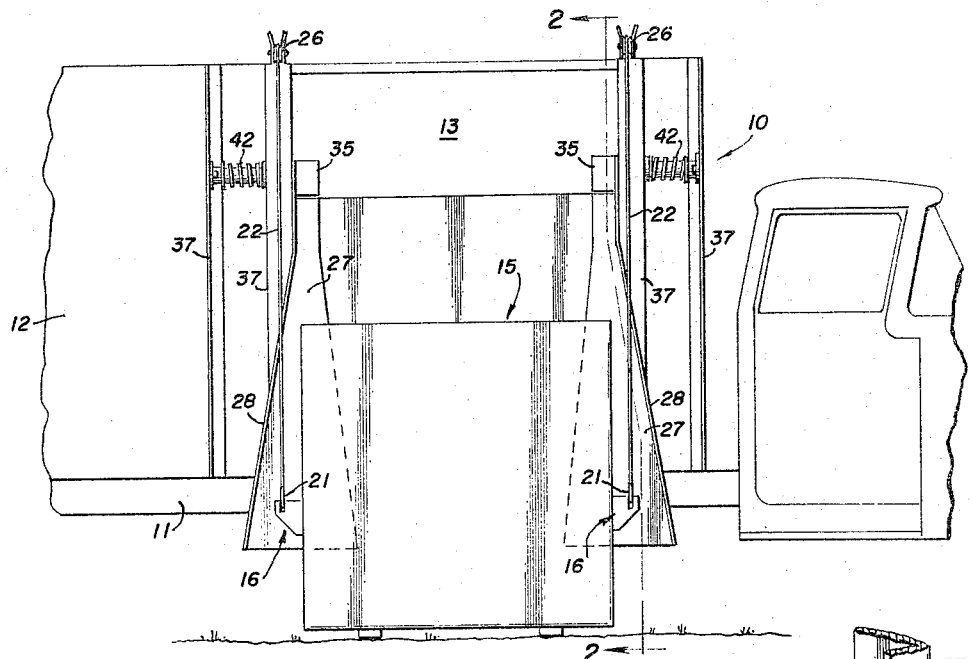
FIGURE 1 is a fragmentary side elevational view of a vehicle including a body and showing a loader in accordance with the invention mounted thereon.

The vehicle 10 shown in the drawings includes a chassis frame 11, a body 12 and a receiving opening 13 in the forward right hand side of the body. While the illustrated vehicle 10 is for use as a garbage collecting truck, the invention is capable of other uses, for example, collecting and transporting dried agricultural products. Additionally, the invention is not limited to truck bodies, but may be adapted for use on trailers or other vehicles where the bodies have side or end walls.

Figure 2:
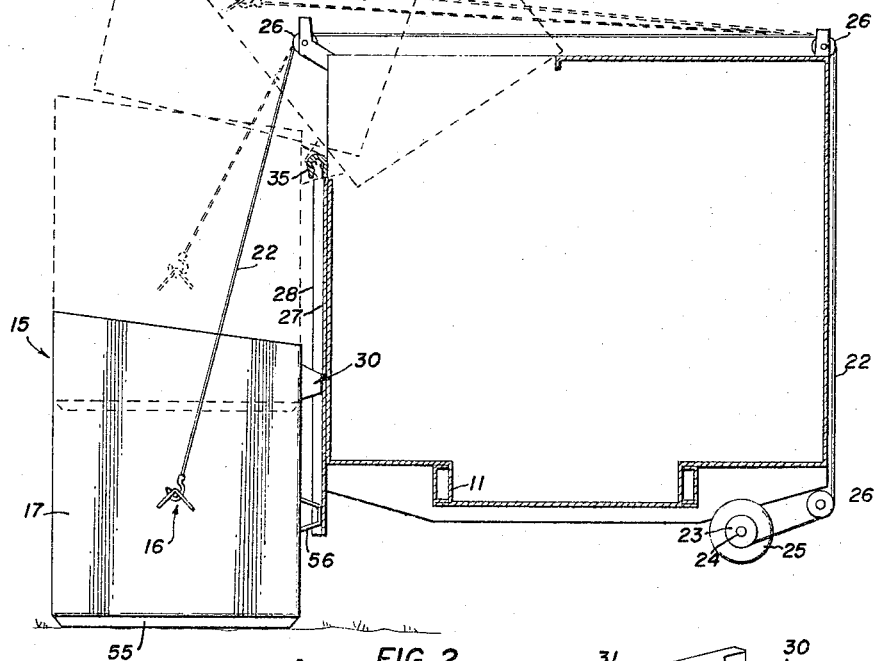
FIGURE 2 is a transverse sectional view taken on line 2—2 of FIGURE 1, and additionally showing progression of the container by means of dotted lines.
Figure 6:
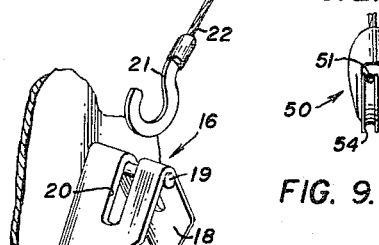
FIGURE 6 is a perspective view of one of the connectors mounted on an end of the container, and a power driven cable and hook for engagement with the connector.

The containers 15 shown are stationed at locations for filling with loose bulk substance, for example, at the rear of restaurants for the accumulation of garbage. Each container 15 has a connector 16 mounted on opposite ends 17 and located generally near the center thereof. The connectors 16 shown in FIGURES 1, 2 and 6 are angular pieces of sheet stock 18 which are welded on the container ends 17. The angles of the sheet stock 18, which are arranged upwardly, have rods 19 secured therein and the sheet stock is slotted, at 20, whereby hooks 21 on the ends of lifting cables 22 may engage the rods.

As best shown in FIGURES 1 and 2, the cables 22 extend over the vehicle body 12, down the side thereof where they are wound on drums 23, only one of which is shown, FIGURE 2. The drums 23 are mounted on a shaft 24 which is driven by a prime mover 25. Cable guide sheaves 26 are located at the corners of the body 12 and have the usual supporting brackets, not numbered.

Figures 3, 4:
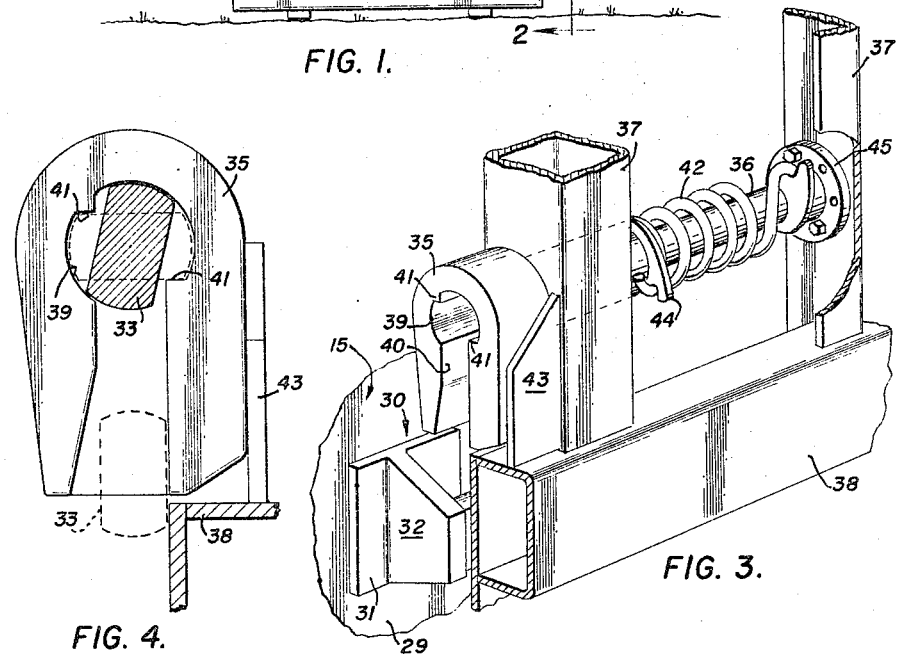
FIGURE 3 is an enlarged fragmentary perspective view of one of the two pivot block and torsion spring assemblies, and additionally showing a portion of a side of the container and a pivot pin mounted thereon for engagement with the pivot block.
FIGURE 4 is an end view of the pivot block, a pivot pin received and partially rotated therein and a stop plate for positioning the pivot block to receive the pivot pin prior to the raising and tilting operation.
Figure 5:
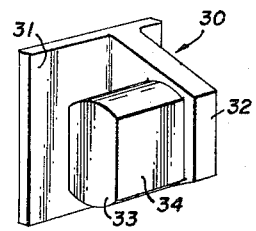
FIGURE 5 is a perspective view of one of the pivot pins apart from the container.

On opposite sides of the body receiving opening 13, and extending therebeneath outwardly of the body 12, there is a pair of skid plates 27 having outwardly projecting flanges 28 along their outer vertical edges. The skid plates 27 are wider at their bottoms than they are at their tops, and the upper portions of the flanges 28 are truly vertical to provide guides and locators for positioning the container 15 just prior to dumping. The side 29 of each container 15 adjacent the vehicle 10, when loading, has a pair of pivot pin assemblies, generally designated at 30, near the upper corners of the container. The pivot pin assemblies 30, best shown in FIGURES 3 and 5, are integral units, and each is comprised of a mounting plate 31, a perpendicular arm 32 and a pivot pin 33 on each arm parallel with its mounting plate. The two pivot pins 33 are directed toward each other in axial alignment and are cylindrical except opposite normally vertical sides 34 are flat and parallel with each other.

Coacting with the pivot pins 33, there are pivot blocks 35 mounted on the inner ends of horizontal aligned shafts 36 journaled in adjacent pairs of vertical side posts 37, which posts may comprise a part of the vehicle body 12. In FIGURE 3 there is a horizontal rail 38 connecting pairs of vertical posts 37, but in practice it has been found that such rails are not necessary. Each pivot block 35 has a cylindrical opening 39 in axial alignment with the shaft 36 on which it is mounted and there is a lateral slot 40 in each pivot block connecting with the cylindrical opening. The width of the slot 40 slidably receives the width of a pivot pin 33, and the diameter of the cylindrical opening 39 rotatably receives the same pivot pin. Inwardly projecting shoulders 41 in the cylindrical opening 39 of each pivot block are arranged for engagement by flat surfaces 34 of the received pivot pin 33 when the latter is turned 90°. Even slight rotation of the pin 33 locks the pin in engagement in the cylindrical opening 39.

The slot 40 is normally held in a vertical position by a coil spring 42 and a stop plate 43 is mounted on a side post 37 to engage the depending outer surface of the block 35. The spring 42 is positioned around the shaft 36 and one end of the spring is secured to the shaft by a retainer 44, whereas the remaining end of the spring is similarly secured to a flange 45 rotatably mounted on the shaft and screwed to the adjacent post 37. The torque of the spring may be adjusted by rotatably adjusting the flange 45.

Figure 7:
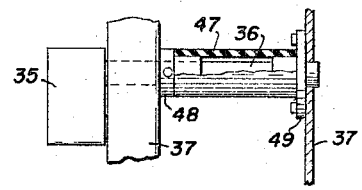
FIGURE 7 is a fragmentary elevational and sectional view of a modified form of pivot block and torsion spring assembly.

The block and torsion spring assembly illustrated in FIGURE 7 includes the described shaft 36 rotatably mounted in vertical posts 37 and the pivot block 35 on one end of the shaft. Instead of the coil spring 36 there is a rubber tube 47, one end of which is secured to the shaft 36 by a shouldered collar 48, whereas the other end is secured to a post 37 by a shouldered flange 49.

Figure 9:
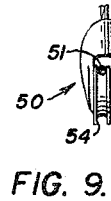
FIGURE 9 is an elevational and sectional view taken at a right angle with reference to FIGURE 8.
Figure 8:
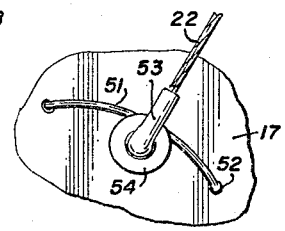
FIGURE 8 is a fragmentary elevational view of a modified cable connector on an end of the container.

The container connectors 50 illustrated in FIGURES 8 and 9 serve the same general purpose as the previously described connectors 16, but have the advantage of a more direct upward pull as the container 15 is being raised and increased leverage as the container is being tilted. This form of connector 50 is comprised of an arcuate track 51 on each end of the container 15 and spaced from the surfaces thereof by short legs 52 at the ends of the tracks. While the tracks 51 are located at or near the centers of the container ends 17, the inner end of each track is lower than its remaining outer end. The ends of the lifting cables 22 have roller clevises 53 and rollers 54 for detachably engaging the tracks 51.

The containers 15 may be mounted on skids 55 or other suitable supports, and the surfaces of the containers including the pivot pin assemblies 30 have spacers 56 beneath the latter, the length of which are equal to the length of the arms 32 of the pivot pin assemblies.

In operation, a container 15 is placed adjacent the skid plates 27 and the lifting cables 22 are connected with the container ends 17. The prime mover 25 is then actuated and the cables 22 raise the container 15 upwardly. The pivot pins 22 first engage the pivot block slots 40 and then the cylindrical openings 39. Continued movement of the cables 22 causes the container 15 to tilt, but at the same time biases the springs 36 or rubber tubes 47, as the case may be. By reason of the locked connection between the pins 33 in the blocks 35, the container may be tilted to such an extent that the relative center of gravity moves from one side to the other with reference to the axis of rotation. Thus, contents of the container 15 are dumped through the opening 13 of the body 12, and by reason of the spring action, upon release of the cables 22, the container is rotated outwardly and is then lowered by the cables to the ground, after which the cables are disengaged.

The invention is not limited to the exemplary construction herein shown and described, but may be made in various ways within the scope of the appended claims.

What is claimed is:

1. In combination with a vehicle having a vertical wall and an opening at the top thereof, rotatable axially aligned pivot blocks mounted on said wall at opposite sides of said opening, said pivot blocks having pin receiving openings in the sides thereof, a container separate from said vehicle, pivot pins on a side of said container positioned to engage said pin receiving openings in said pivot blocks and wherein said pin receiving openings are cylindrical at their axis of rotation and are slotted laterally thereof, and wherein said pivot pins are cylindrical and of a size to rotate in said pin receiving openings and are flat on opposite sides and of a dimension therebetween to be slidably received in said slots, and means raising and tilting said container.

2. In combination with a vehicle having a vertical wall and an opening at the top thereof, rotatable axially aligned pivot blocks mounted on said wall at opposite sides of said opening, said pivot blocks having pin receiving openings in the sides thereof, a container separate from said vehicle, pivot pins on a side of said container positioned to engage said pin receiving openings in said pivot blocks, means raising and tilting said container and spring biasing means resisting rotation of said container during its tilting operation.

3. In combination with a vehicle having a vertical wall and an opening at the top thereof, rotatable axially aligned pivot blocks mounted on said wall at opposite sides of said opening, said pivot blocks having pin receiving openings in the sides thereof, a container separate from said vehicle, pivot pins on a side of said container positioned to engage said pin receiving openings in said pivot blocks, means raising and tilting said container comprised of a pair of cables connected with the ends of said container and extending upwardly and over said wall, and means pulling said cables, the connection of said cables with said container being comprised of arcuate tracks on the ends of said container and rollers on the ends of said cables engaging said tracks, said tracks being generally located at the centers of said ends of said container and generally horizontally disposed when said container is in an upright position.

References Cited by the Examiner

UNITED STATES PATENTS

| | | | |
|---|---|---|---|
| 2,847,135 | 8/1958 | Galloway | 214—75 X |
| 2,877,910 | 3/1959 | Nelson | 214—302 |
| 3,001,655 | 9/1961 | Tippet | 214—302 |
| 3,032,216 | 5/1962 | McCarthy | 214—302 |

HUGO O. SCHULZ, *Primary Examiner.*